Feb. 27, 1968     I. H. MACKENZIE     3,370,469
BOILER LIQUID LEVEL INDICATOR
Filed Sept. 13, 1966     3 Sheets-Sheet 2
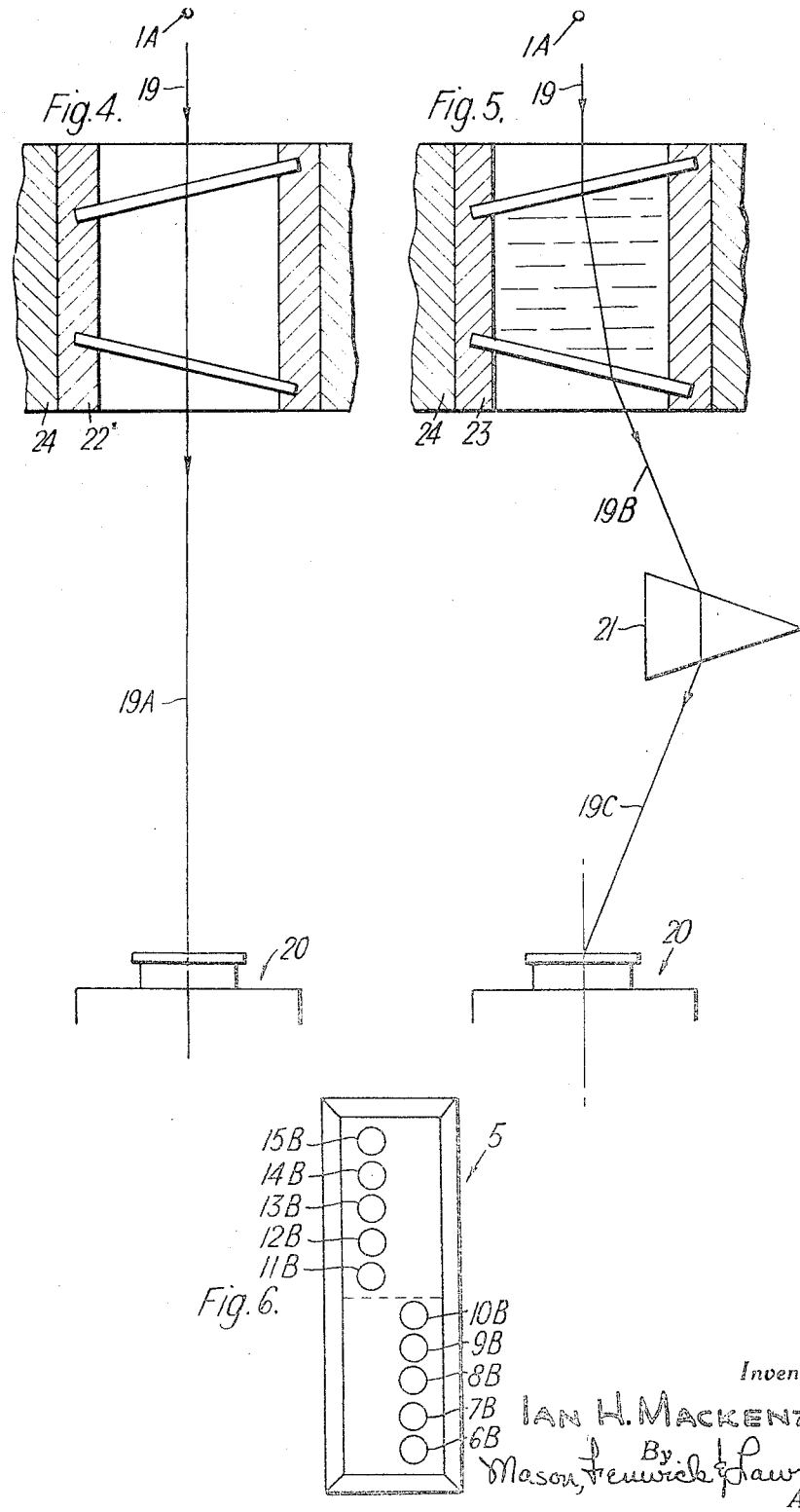

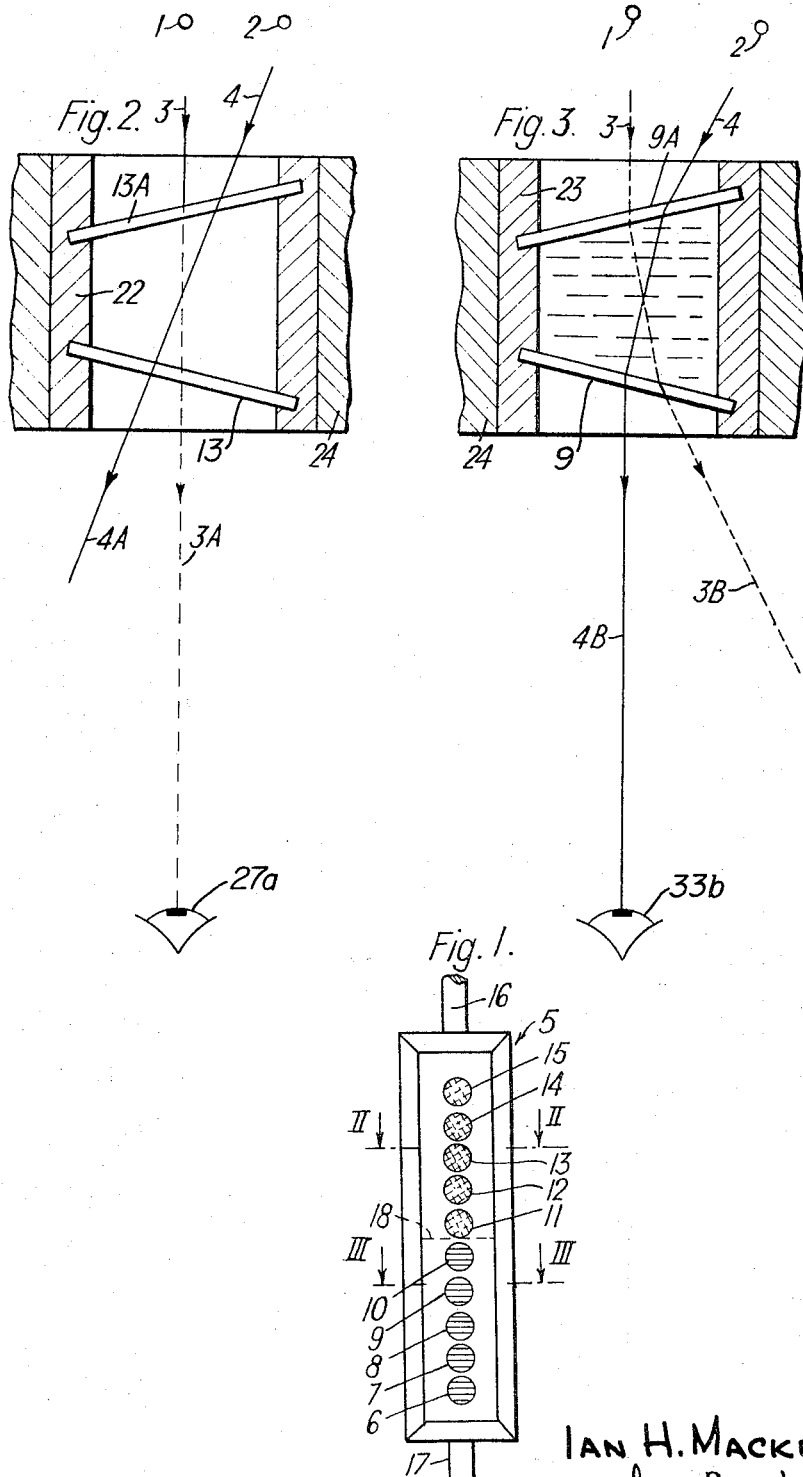

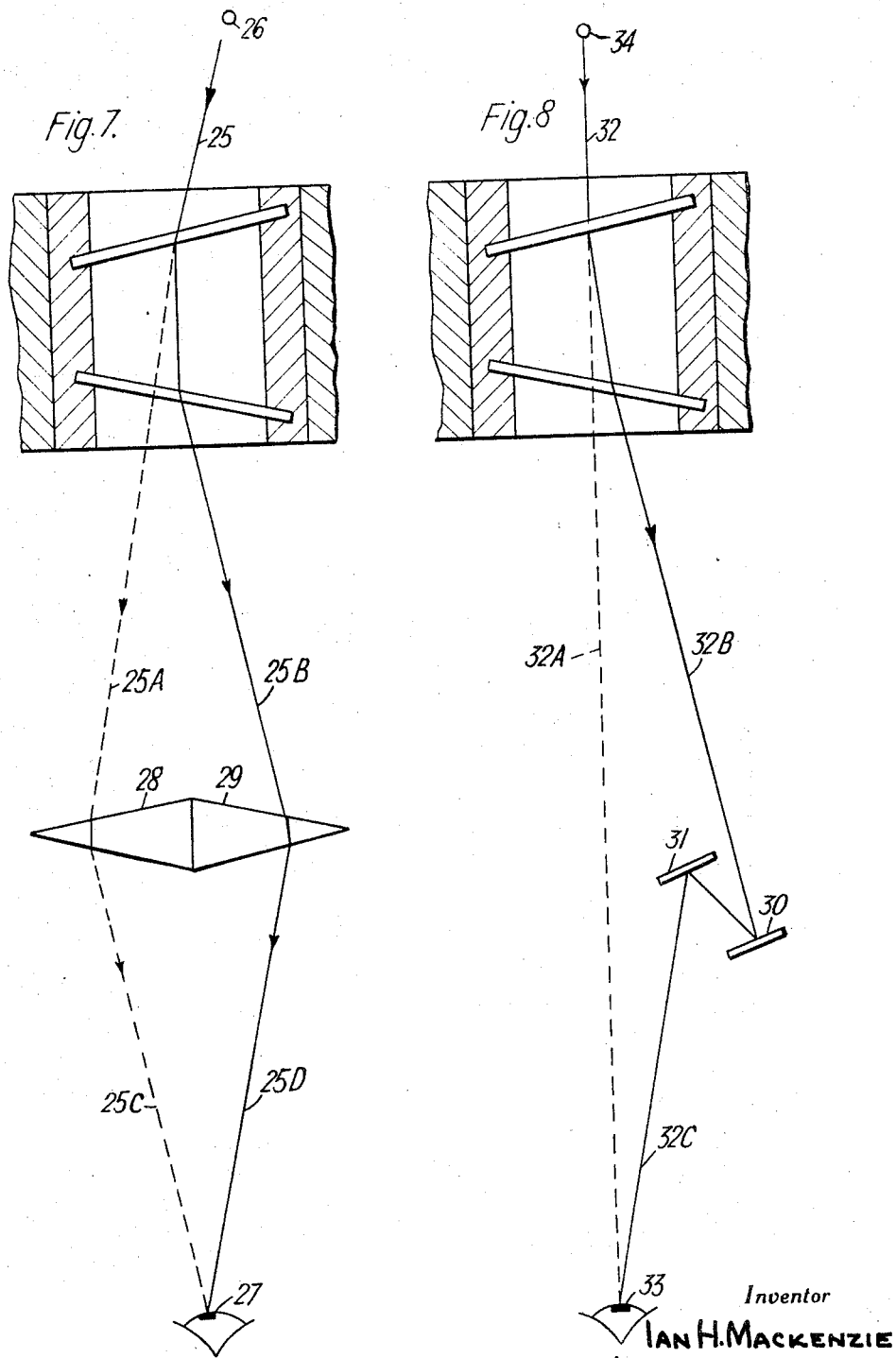

3,370,469
BOILER LIQUID LEVEL INDICATOR
Ian H. Mackenzie, Anniesland, Glasgow, Scotland, assignor to Barr and Stroud Limited, Glasgow, Scotland, Great Britain, a British company
Filed Sept. 13, 1966, Ser. No. 579,051
Claims priority, application Great Britain, Dec. 18, 1965, 53,767/65
10 Claims. (Cl. 73—331)

This invention relates to apparatus for providing an indication of the level of water in a boiler.

One type of such apparatus which provides a visual indication is already known in the form of a gauge glass which comprises a vertical tube connected at each end to the boiler so as to be in free communication with the water and steam therein. The tube has two opposed walls, which are mutually convergent laterally so that a column of water in the tube is of prismatic form. Each of said walls has a vertical column of spaced small windows, one column being referred to as the light entrance windows and the other column being referred to as the viewing windows. Two differently coloured beams of light, say an orange beam and a blue beam, are mutually angled in the horizontal plane and converge on the light entrance windows, and pass therethrough into the tube, and the angle between the beams and between the windows is such as to produce the following result at the viewing or light exit windows. When the tube contains a column of water and a column of steam, the blue light passes through a lower group of windows and is deflected by the water so that it travels towards the observation point. The blue light passing through the upper group of windows passes straight through the windows and so does not travel towards the observation point. In a similar manner, the orange light passing through the lower group of windows is deflected by the water and so does not travel towards the observation point, while the orange light passing through the upper group of windows passes straight through and so travels towards the observation point. This is due to the refraction effect of the column of water, which has a prismatic form, whereas there is substantially no refraction effect by a similar column of steam since the coefficient of light refraction of steam is so small as to be negligible.

Under normal operating conditions of the boiler each colour appears in some of the viewing windows, and the apparatus is therefore usually called a bi-colour water level indicator.

In another such apparatus, each of the said opposed walls of the gauge tube is in the form of a single full-length window, and the beams appear in the viewing window as a lower blue column directly below an upper orange column of light.

In a large power plant, such a boiler and its gauge is usually at some considerable height above the control room, and, generally, the gauge cannot be easily viewed directly. A closed circuit television system may therefore be used to view the gauge. In this case, however, there is a disadvantage in that the television camera is unable to detect the difference between the two colours in the viewing windows and therefore relays to the display screen an image in which the blue light and the orange light are virtually the same, differing only by perhaps a small degree of brightness.

An object of the present invention is to provide such apparatus in which the difference between the water windows and the steam windows is more easily detected, especially when viewed through television.

According to the present invention apparatus for providing an indication of the level of water in a boiler comprises in combination a water gauge tube having a column of light entrance windows, and an opposed column of light exit or viewing windows facing a viewing point, and light projecting means adapted to project a beam of light on to the entrance windows, the said windows and light projecting means being adapted and arranged so that the upper and lower portions of the beam when passing respectively through steam and water in the tube emerge mutually divergent through upper and lower groups of the viewing windows, and light transmitting or reflecting optical means in the path of at least one of the emergent portions of the beam adapted to bring same into convergence at the viewing point so that, when viewed from the viewing point, both said groups are visible and appear mutually displaced.

The columns of entrance and viewing windows may be replaced by single windows of the same length as the columns, in which case the beam portions appear as mutually displaced columns of light.

Thus, further according to the present invention I provide apparatus for providing an indication of the level of water in a boiler comprising in combination a water gauge tube having an elongated light entrance window, and an opposed light exit or viewing window facing a viewing point, and light projecting means adapted to project a beam of light on to the entrance window, the said windows and light projecting means being adapted and arranged so that upper and lower portions of the beam when passing respectively through steam and water in the tube emerge mutually divergent through upper and lower parts of the viewing window, and light transmitting or reflecting optical means in the path of at least one of the emergent portions of the beam adapted to bring same into convergence at the veiwing point so that, when viewed from the viewing point, both said beam portions are visible and appear as mutually displaced columns of light.

The said optical element may be a wedge-shaped prism.

An embodiment of the invention will now be described, by way of example, with reference to the accompanying diagrammatic drawings, in which:

FIG. 1 is a front view of a known water gauge tube, which is also used in the apparatus according to the present invention, FIGS. 2 and 3 are cross sectional view on the lines II—II and III—III of FIG. 1 to an enlarged scale, FIGS. 4 and 5 are views corresponding to FIGS. 2 and 3 of one embodiment of apparatus according to the present invention, FIG. 6 shows a front view of the gauge to a reduced scale as it appears to a viewer, and FIGS. 7 and 8 are views corresponding to FIG. 5 of further embodiments of the invention and showing both portions of the beam.

Referring to FIGS. 1 to 3 of the drawings, which show known apparatus as hereinbefore described, the sources of orange and blue light are indicated at 1 and 2 respectively, and the orange and blue beams are indicated at 3 and 4.

In FIG. 1, the gauge tube is indicated at 5, and the viewing windows in the column at the front of the tube 5 are numbered 6 to 15. The pipes connecting the tube 5 to the boiler, not shown, are indicated at 16 and 17, and the chain-dotted line 18 indicates the normal water level in the tube 5. There is a corresponding column of light entrance windows in the opposite wall of the tube 5 at the rear, but only two of these can be seen in FIGS. 2 and 3 and are referenced 13A and 9A respectively.

The beam 3 is normal to the gauge tube 5 and the beam 4 lies at a predetermined angle thereto. The portions of the beams 3, 4 which pass through the steam pass straight through the gauge as shown in FIG. 2, and the portions of the beams 3, 4 which pass through water are deflected as shown in FIG. 3 due to refraction by the water. The emergent portions of the beams are indicated at 3A and 4A in FIG. 2 and at 3B and 4B in FIG. 3, with beams 3a and 4b received at the viewing points 27a and 33b, respectively. In the present example, the orange beam portion 3A passes through and emerges normal to the upper group of viewing windows 11 to 15, and the blue beam portion 4B passes through and emerges normal to the lower group of windows 6 to 10. As above explained, the only difference, if any, in appearance of the two groups of windows, when viewed by television, is that one group is slightly brighter than the other, and the position of the water level is therefore difficult to detect.

In the embodiment of the present invention shown in FIGS. 4 to 6, only one beam 19 from a source 1A is used and it enters normal to the gauge tube, the latter being the same as that shown in FIG. 1. The upper portion of the beam passes through steam and passes straight through the gauge, as shown in FIG. 4, to a viewing point, which in the present embodiment is a television camera 20. The lower portion of the beam passes through water and is deflected away from the camera 20, due to refraction by the water, as shown in FIG. 5. The emergent beam portions are indicated at 19A and 19B.

An optical element, such as the wedge-shaped prism 21 shown is located in the path of the emergent beam portion 19B so that the beam portion is bent back towards the camera 20 as shown at 19C in FIG. 5.

Assuming that the water level is the same as is shown at 18 in FIG. 1, the beam portions 19A and 19C then pass through the same respective groups as in FIG. 1. However, due to the prism 21, the lower group of viewing windows appear displaced to one side relative to the upper group of viewing windows. This is shown in FIG. 6, in which the uper group of windows are numbered 11B to 15B and the lower group are numbered 6B to 10B. It will be understood that, if the water level lowers, more windows will appear in the uper group and correspondingly fewer will appear in the lower group, and vice versa if the water level rises.

As a result, although all the viewing windows are of equal brightness, the water level is much more easily seen than hitherto, especially on a television screen, by virtue of the apparent displacement of the upper and lower groups of viewing windows. Moreover, only one light beam is required, so that the apparatus is simplified.

In FIGS. 2 to 5, the numerals 22, 23 indicate holders for the windows 13, 13A, 9, 9A and the numeral 24 indicates the casing of the gauge 5.

In the embodiment shown in FIG. 7, the beam 25 from a source of light 26 is not normal to the gauge tube. That is to say, the beam 25 is not directed towards the viewing point 27 so that neither of the emergent portions 25A, 25B of the beam is directed towards the viewing point 27. In this case, two optical elements such as the wedge-shaped prisms 28, 29 are provided, one in the path of each beam portion 25A, 25B so that both beam portions are bent towards the viewing point 27 as shown at 25C and 25D.

The embodiment shown in FIG. 8 corresponds to that shown in FIG. 5 except that the prism 21 in the FIG. 5 embodiment is replaced by two reflectors 30, 31. The reflector 30 lies in the path of the emergent beam portion 32B and reflects the beam portion to the reflector 31 from which the beam portion is reflected towards the viewing point 33 as shown at 32C. 32A indicates the other portion of the beam, 32 indicates the beam entering the gauge, and 34 indicates a source of light.

While a gauge in which there is a column of small light entrance windows and a corresponding column of light exit or viewing windows is preferred, it is possible to replace these by single windows extending the lengths of the columns. In this case, the beam portions appear in the viewing window as mutually displaced columns of light.

It will be understood that each of the prisms 21, 28, 29 and the reflectors 30, 31 corresponds in length to the column of viewing windows or to the single elongated viewing window.

I claim:

1. Apparatus for providing an indication of the level of water in a boiler comprising in combination a water gauge tube having a column of light entrance windows, and an opposed column of light exit or viewing windows facing a viewing point, and light projecting means adapted to project a beam of light on to the entrance windows, the said windows and light projecting means being adapted and arranged so that upper and lower portions of the beam when passing respectively through steam and water in the tube emerge mutually divergent through upper and lower groups of the viewing windows, and optical light transmitting or reflecting means in the path of at least one of the emergent portions of the beam adapted to bring the two emergent portions of the beam into convergence at the viewing point so that, when viewed from the viewing point, both said groups are visible and appear mutually displaced.

2. Apparatus for providing an indication of the level of water in a boiler comprising in combination a water gauge tube having an elongated light entrance window, and an opposed light exit or viewing window facing a viewing point, and light projecting means adapted to project a beam of light on to the entrance window, the said windows and light projecting means being adapted and arranged so that upper and lower portions of the beam when passing respectively through steam and water in the tube emerge mutually divergent through upper and lower parts of the viewing window and optical light transmitting or reflecting means in the path of at least one of the emergent portions of the beam adapted to bring the two emergent portions of the beam into convergence at the viewing point so that, when viewed from the viewing point, both said beam portions are visible and appear as mutually displaced columns of light.

3. Apparatus as claimed in claim 1, in which one of the emergent beam portions is directed to the viewing point as it emerges from the gauge so that said optical means is provided in the path of the other emergent beam portion only.

4. Apparatus as claimed in claim 1, in which each of the emergent beam portions is directed away from the viewing point as it emerges from the gauge, and said optical means is provided in the path of each emergent beam portion.

5. Apparatus as claimed in claim 3, in which said optical means is a wedge-shaped prism.

6. Apparatus as claimed in claim 4, in which said optical means is a wedge-shaped prism.

7. Apparatus as claimed in claim 3, in which said optical means are two reflectors.

8. Apparatus as claimed in claim 4, in which said optical means are two reflectors.

9. Apparatus as claimed in claim 1, in which a camera in a closed-circuit television system is located at said viewing point.

10. Apparatus as claimed in claim 2, in which a camera in a closed-circuit television system is located at said viewing point.

References Cited

UNITED STATES PATENTS

| 1,737,126 | 11/1929 | Reyling et al. | |
| 3,128,626 | 4/1964 | Faber | 73—331 |

FOREIGN PATENTS 879,248   10/1961   Great Britain.

LOUIS R. PRINCE, *Primary Examiner.*

DANIEL M. YASICH, *Assistant Examiner.*